United States Patent [19]

Heuschkel

[11] Patent Number: 5,032,072
[45] Date of Patent: Jul. 16, 1991

[54] DEVICE FOR PRODUCING SHAPED OBJECTS FROM THERMOPLASTIC PLASTICS

[76] Inventor: Uwe Heuschkel, Klosterstrasse 22, 6520 Worms, Fed. Rep. of Germany

[21] Appl. No.: 376,202

[22] Filed: Jun. 29, 1989

Related U.S. Application Data

[62] Division of Ser. No. 58,355, Jun. 4, 1987, Pat. No. 4,874,556.

[30] Foreign Application Priority Data

Jun. 6, 1986 [DE] Fed. Rep. of Germany ....... 3619144

[51] Int. Cl.$^5$ .................... B29C 45/04; B29C 45/76
[52] U.S. Cl. ................................ 425/150; 264/297.2; 264/297.6; 264/DIG. 69; 425/169; 425/185; 425/253; 425/453; 425/567; 425/575; 425/DIG. 46; 425/DIG. 108
[58] Field of Search ............... 264/297.3, 297.6, 297.7, 264/DIG. 69, 297.2; 425/147, 150, 182, 185, 190, 192 R, 261, 253, 567, 574, 575, DIG. 16, DIG. 46, DIG. 201, 453, 169, DIG. 108

[56] References Cited

U.S. PATENT DOCUMENTS

| 2,921,336 | 1/1960 | Crafton | 425/261 |
| 3,973,891 | 8/1976 | Yamada | 425/575 |
| 4,187,352 | 2/1980 | Klobbie | 264/DIG. 69 |
| 4,354,813 | 10/1982 | Collombin | 425/185 |
| 4,571,171 | 2/1986 | Blank et al. | 425/150 |
| 4,626,189 | 12/1986 | Hammer et al. | 425/147 |
| 4,710,122 | 12/1987 | Villanueva | 425/261 |

Primary Examiner—Jay H. Woo
Assistant Examiner—James P. Mackey
Attorney, Agent, or Firm—Michael J. Striker

[57] ABSTRACT

In a device for making shaped objects from plastic refuse plasticized in a roller extruder under pressure and ejected from the nozzle of the extruder a plurality of molds are provided transported to the extruder, filled thereby and transported therefrom. Each mold has at the end face a plate having a filling opening. During the filling process this plate sealingly overlaps the surface surrounding the nozzle so that the mold can be filled with plasticized plastic under the pressure generated in the roller extruder.

11 Claims, 4 Drawing Sheets

DEVICE FOR PRODUCING SHAPED OBJECTS FROM THERMOPLASTIC PLASTICS

This is a division of application Ser. No. 058,355, filed June 4, 1987, now U.S. Pat. No. 4,874,556.

BACKGROUND OF THE INVENTION

The present invention relates to a device for making shaped articles from thermoplastic plastics, particularly non-cleaned, non-sorted plastic refuse.

With methods and devices of the type under consideration plastic refuse is plasticized in a roller extruder and fed into molds in which pressure is applied to the plastic filling the molds which are afterwards cooled and from which shaped objects are thereafter removed.

Methods and devices for a repeated use of plastic refuse or plastic trash have been not, however, known until now.

It is known that plastic refuse which was cleaned, sorted and re-granulated was treated together with a new plastic to produce plastic articles. Since the cleaning and sorting involves a manual work and the plastic refuse or trash is a garbage-like or trash-like non-homogeneous substrate no working forces are normally available in the economy to do this kind of work; and when such forces are found this kind of work is too expensive. A remarkable portion of new plastic does not solve the problem because the product consisted of such re-granulated material cannot be successfully marketed due to its quality and is a so-called second choice. It is particularly difficult to use this re-granulate due to high costs of production.

Re-granulates are as a rule plasticized for processing in worm-type extruders.

The solution of the problem has been found in the field of elimination of industry and household thermoplastic refuse and trash in the utilization of roller extruders disclosed, for example, in DE-PS No. 27 00 846. The roller extruder is so robust that it not only is able to process non-cleaned, non-sorted thermoplastic trash or refuse but also rock and metal particles included in the plastic trash or refuse so that the plasticized thermoplastic plastic remains homogeneous and has no quality deficiencies. The plasticized material pushed from the nozzle of the roller extruder, however, has been until now, calibrated into pieces of suitable size by hand, cut and fed into respective molds in which the plastic was pressed by suitable devices. The objects formed of plastic normally had the weight of less than one kilogram.

Despite the homogenizing and high pressures used for producing shaped articles such articles are of pure quality and no market exists for such articles. Such articles can be relatively expensive when there is a chance of amortization of initial costs; they should however not be expensive on the market where a consumer is found.

The thermoplastic refuse material plasticized in the roller extruder can result in the material which is acid-resistant, weather-resistant and resistant to insects and further damaging factors and which would have high rigidity.

In order to solve the problem of increasing amounts of collected plastic refuse or trash the elimination of which by burning is costly and problematic it has been suggested to introduce this refuse into the economical circuit as a worthwhile crude product which would find a consumer. It has been found that such product pallets should consist of articles which are large and heavy not only because a great deal of plastic refuse is consumed but also because heavy articles, for example having weight of 100 or many hundred kilograms are not of a third choice as it concerns their quality, but their properties, which affect quality of small products, can be utilized.

Three groups of shaped objects were selected as preferable product pallets, namely universal plates, solid profiles and hollow bodies. The solid profiles can be utilized similarly to bricks for making palisades; they can form non-prismatic shapedtable plates, warning signal pedestals or the like.

In the production of these objects which has been carried out by methods as described herein above, such objects are always too expensive to be on the market, and practically it has been impossible to find consumers for such objects.

SUMMARY OF THE INVENTION

It is an object of the present invention to provide an improved device for producing shaped objects from thermoplastic materials.

It is another object of this invention to provide a device by means of which extreme production and installation costs of making shaped objects would be avoided.

These and other objects of the invention are attained by a device for producing shaped objects from thermoplastic plastics, particularly non-cleaned, non-sorted plastic refuse, comprising a roller extruder for plasticizing a plastic refuse and having a nozzle discharging a plasticized plastic under pressure of the extruder; molds receiving said plastic from said nozzle under pressure up to 140 Bar and shaping said objects upon solidifying of said plastic, each mold having at least at one end face a base plate having a filling opening centered to an axis of the mold and adjusted to said nozzle; guide means extending at least parallel to a vertical plane of said nozzle and at right angles to a direction of ejection of said nozzle, said molds with said base plates being aligned and displaceable in said guide means with axes of elongation of the molds parallel to said direction of ejection, said base plate being sealingly guided over a surface surrounding said nozzle, said guide means at one end opening into a feeding station; a pressure cylinder provided in said feeding station and aligned in a direction of elongation of said guide means and having a working stroke of the length corresponding to the width of said base plate, said guide means including a storage station positioned next to said feeding station in the direction of said nozzle, said storage station having a length corresponding at least to the width of said base plate, a filling station in which said nozzle is positioned and including a waiting zone in the direction of a stroke of each mold, said waiting zone having a length corresponding to the width of a number of base plates, at least one mold with the base plate thereof positioned behind said nozzle, as viewed in the direction of the displacement of said molds, sealingly sliding against a surface surrounding the nozzle; and a discharge station provided at the end of said guide means and having a lifting plate applied to said base plate to sealingly hold the same and to close said filling opening, said lifting plate being insertable into and removable from said discharge station.

With the device according to the invention the known roller extruder is so sealed and modified that a plasticized plastic contained in the extruder builds up pressure up to 140 Bar and this pressure is maintained and reliably sealed. Thus there is a possibility due to this invention that a plasticized plastic is pushed out from the extruder through its nozzle with the pressure which is not only sufficient to fill the molds but also to omit customary presses in the molds. There is therefore a possibility that the molds be filled in the position immediately against the extruder nozzle.

The molds must be, on the one hand, locked and held against the displacement or pressure of the plasticized plastic ejected from the extruder nozzle and must be, on the other hand, quickly cyclically exchanged; then the extruder of the foregoing type which is utilized for plasticizing plastic refuse cannot be cyclically switched on and off. Therefore the provision of the device with the guide means aligned with the plane of the extruder nozzle and the provision of each mold with at least one base plate having a filling opening would ensure that the molds will be held and slide in those guide means. The base plate which covers the front end face of each mold has the shape and the size adjusted to those of the nozzle. The filling opening in the filling position is located against the extruder nozzle.

Each mold may have in a base plate opposite to that having said filling opening, holes for optical observation of a filled condition. Optical sensors may be provided at said holes to control the filling process in each mold. The signal indicative of the filled condition from the sensor is delivered to the pressure cylinder for the exchange of the mold before the nozzle of the extruder.

According to the invention the emptied molds stored in the storage zone are moved during the mold exchange operation to the extruder nozzle while the previously filled mold is moved, at this time, away from the extruder nozzle. During this exchanging process the front or extruder side outer surfaces of the base plates of the molds slide on the surface surrounding the nozzle thereby sealing the nozzle, particularly during the exchange of the molds. This short closing of the nozzle does not affect the working cycle and the output of the extruder. The quickly filled mold must be held with the filling opening closed to prevent flowing of the pressed plastic out of the mold. This closing according to the method and device of this invention is obtained by laying the base plate against the surface surrounding the nozzle or immediately by the lifting plate which is inserted into the guide means and to which the mold with the base plate is moved.

The device may further include a first conveyor extending perpendicular to guide means and connected to said discharge station; cooling means including a water bath receiving said molds and a pneumatic grate and connected to said first conveyor, said cooling means having at an end thereof a mold-opening station; a platform positioned at said mold-opening station so that shaped objects are removed from said molds and placed on said platform; a second conveyor extending perpendicular to said first conveyor and receiving and transporting emptied molds, said second conveyor having means for aligning the molds being transported longitudinally of the second conveyor; a carrousel connected to said second conveyor for turning said molds by 90° and provided with a pressure cylinder; an intermediate conveyor receiving said molds pushed by said pressure cylinder from said carrousel, said intermediate conveyor extending at right angles to said second conveyor and transporting said emptied molds to said feeding station; a U-shaped rail extending parallel to said intermediate conveyor and receiving said molds therefrom; two pressure cylinders positioned laterally of said intermediate conveyor for pushing said molds into said U-shaped rail in the direction transversal to an elongation of said intermediate conveyor, said U-shaped rail opening into said feeding station and having a pressure cylinder displacing said molds along said U-shaped rail towards said feeding station, said all pressure cylinders being contact-controlled, said pressure cylinder aligned in the direction of elongation of said guide means being controlled in said filling station by sensors corresponding to holes in said molds. This device ensures a completely automatic process.

Each mold may be provided with two base plates at two end faces, respectively. Said two base plates may be of the same shape and size.

The base plates, depending on the shape of the object being formed may be of different shapes, square, rectangular, circular, etc.

For the molds with two base plates the guides must be formed so as to be able to receive two base plates. This is advantageous because pressure reactions can be taken up during the filling of the mold more easily.

The molds may have the volume to receive 100 or more kilogram of the plasticized plastic from said extruder. Therefore heavy large objects can be shaped with the device of the invention.

The objects to be shaped can be rather long. An optimal ratio between the dimensions of the mold, namely its diameter and the length, for shaping such objects may be at most 1.15. With the molds having other cross-sections than circular, the cross-section area must be calculated and converted into the circular area to determine a suitable ratio. Thus unexpectedly, very long shaped articles can be produced.

It is essential in the method of this invention that the filling opening of the base plate is maintained closed until the edge zone solidifying of the plastic in the mold is ensured so that the plastic cannot flow out of the mold. Then a quick cooling in the water bath and with the aid of a pneumatic grating is executed. The molds after passing the cooling station are placed to the second conveyor by hand. The carrousel is rotatable so that the molds transported by the second conveyor are turned at the carrousel such that when they reach the intermediate conveyor extended perpendicular to the second conveyor, and particularly the feeding station and the filling station, the base plate having the filling opening always faces the nozzle of the extruder. Therefore, the feeding process can be cyclically adjusted to the ejection process.

The molds may be filled with loads up to 100 kg of the plastic ejected from the extruder. To fill the mold with such a load at least five minutes are required. However the filling process can take longer time if the shapes and dimensions of the molds require. Therefore the device is provided with sensors for determining a filled condition of each mold, and a stroke-applying device for cyclically moving a mold inserted into the feeding station together with the molds positioned in the storage zone in the guides in the direction towards said nozzle depending on a sensor-controlled filled condition of the mold already positioned against said nozzle. Sensors may be applied to the control holes formed in the mold itself. Thus due to the controlling of the filling process in the molds the working cycle is controlled depending on the ejection of the roller extruder or depending on the filling of the molds. On the other hand, the filled mold remains at the extruder nozzle sufficiently long and an undesired additional pressure build up is prevented in the roller extruder.

The aforementioned lifting plate is insertable into the guide means by the device operating in dependence upon contacts provided on the molds; the filled molds after solidifying of said plastic therein are transported in a direction toward said cooling step transversely to a direction of displacement of said molds toward said nozzle. The steps of filling the molds, cooling the filled molds, feeding the emptied molds to said input station, and the cyclical mold exchange before said nozzle are executed automatically. Therefore mass production of shaped articles of high quality and inexpensively made is possible.

Such shaped articles could be readily presented on the market.

The novel features which are considered as characteristic for the invention are set forth in particular in the appended claims The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
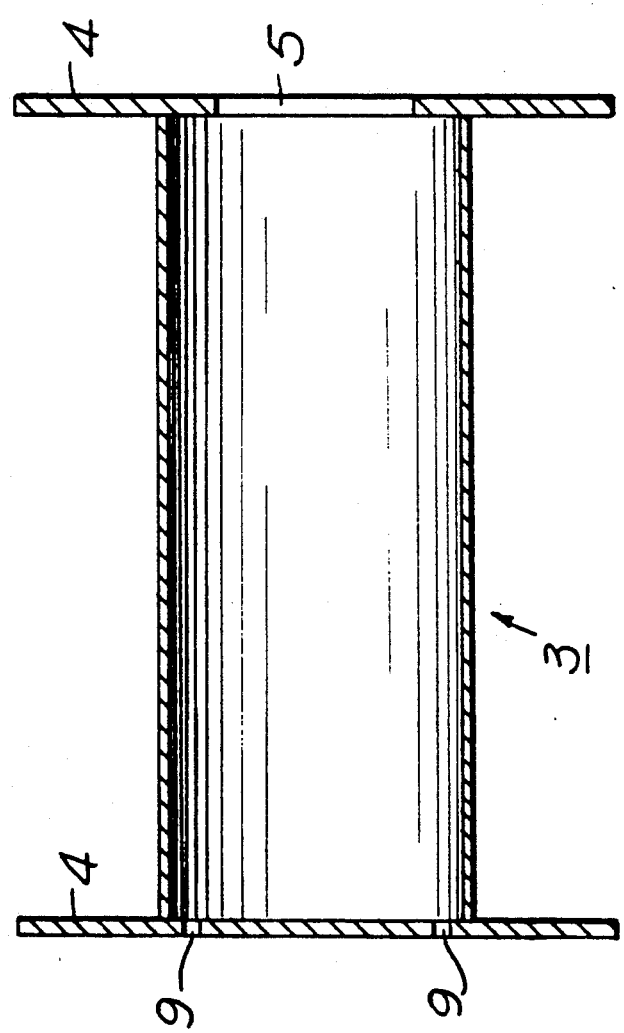
FIG. 1 is an axial sectional view of one embodiment of the mold for a cylindrical solid body.

Referring now to the drawings in detail, it will be seen that a roller extruder 1 is shown only schematically. Roller extruder 1 has a nozzle 2, from which plastic refuse of thermoplastic type material which has been non-cleaned and non-sorted and plasticized and homogenized in the extruder, is pushed out. The structure of the roller extruder 1 is not shown in detail. It is not shown also that the plastic refuse before entering the extruder is comminuted to the particle size of about 6 mm and is periodically dosed by means of a centrifugal sluice.

Roller extruder 1 which is of a commercially available type has been modified so that in addition to plasticizing the plastic refuse by frictions, particularly non-cleaned plastic trash, it provides the ability to treat the plastic material which has some inclusions of rock or metal and, at the same time produce in the plasticized, homogeneous plastic mass a pressure in the range up to 140 Bar. This modification only concerns the improvement in the bearings or support of the roller and is not shown in the drawing. The modification must maintain high developed pressures.

It is very important that the plasticized homogenous plastic be pressed out from the extruder nozzle 2 under pressure. Due to this feature rt is possible to fill molds 3 under the pressure of the roller extruder 1. For this purpose, molds 3 must be locked against the pressure of the plasticized plastic discharged from the extruder nozzle 2 because they can otherwise slide away from the extruder nozzle 2 or the material discharged therefrom. To achieve this, molds 3 each has at least at the side of filling a base plate 4 (FIG. 1) which has in the center of mold 3 a filling opening 5 which is adjusted in shape and size to the shape and size of the extruder nozzle 2. The base plate 4, during the filling process stands vertically while the axis of elongation of the mold is horizontal. In order to take up filling pressure reactions, guides 6 are provided, shown in FIGS. 2-5 and 6. As can be seen from FIGS. 3 and 4, guides 6 include a frame 7 which extends in the vertical direction parallel to an upper surface 8 surrounding the extruder nozzle 2 and is formed at the ends of C-shaped rails or C-profiles so that the base plates 4 are engaged in these C-profiles with their upper and lower edges and guided and held against pressure in these C-profiles which face each other with open recesses.

It is, of course, understandable that molds 3 are each shaped in accordance with the shape of the article to be produced The molds are particularly suitable for producing pallets of large size and can receive up to 100 kg or more of plasticized plastic.

FIG. 1 illustrates the axial section of mold 3 which has base plate 4 at both end faces, whereby the extruder-side base plate 4 has a filling opening 5. The mold can be shaped also for producing prismatic articles or of circular or square or other cross-section. The other base plate 4, opposite to that having the filling opening 5, closes the rear end of the mold, remote from the extruder. This rear-side base plate 4 has at the upper and lower regions control openings 9. When the mold 3 is positioned in front of the extruder nozzle 2 optical sensors 10 (FIG. 7) control the filling process through control openings 9.

Figure 3:
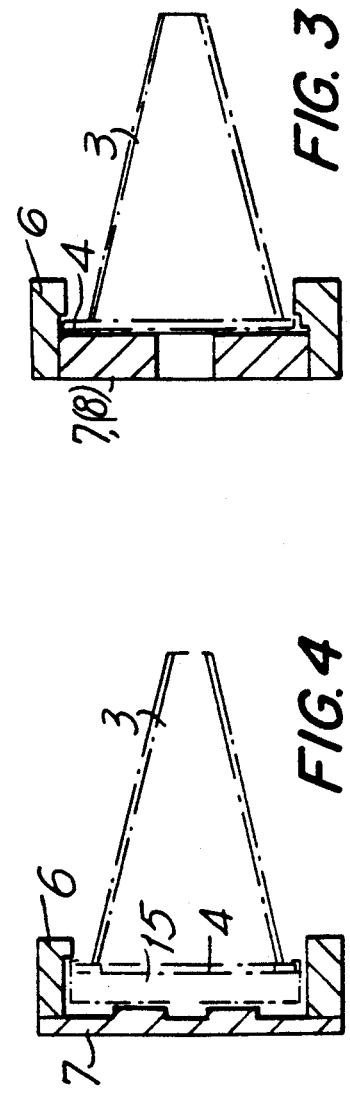
FIG. 3 is a sectional view taken along line III—III of FIG. 2.
Figure 4:
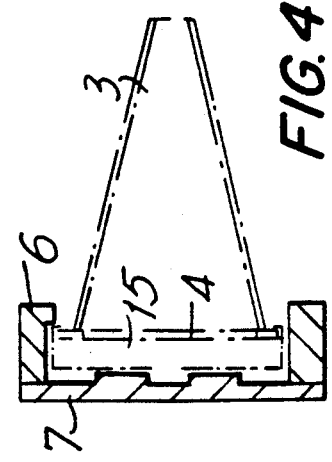
FIG. 4 is a sectional view taken along line IV—IV of FIG. 2.

FIGS. 3 and 4 illustrate the molds 3 which have only one base plate 4 and which are provided for non-prismatic, conical or wedge-shaped articles. The control openings 9 and optical sensors 10 can be provided at suitable places of these molds 3.

Further modified molds are conceivable, which can be utilized for universal plates, for other shapes of the articles and also for hollow articles. For heavy shaped articles, the molds should have two base plates 4 in order to facilitate handling of the mold. The molds can have a relatively high ratio of slenderness in order to produce rod-like material when such ratio between the cross-section and the length of the mold is maintained, which would insure that with the pressure generated in the roller extruder 1 the mold 3 would be easily filled with the plasticized material. When the mold with the circular cross-section has the diameter of about 20 cm the length of such mold would be maximally 300 cm or the diameter dimension multiplied by 15. With other cross-sections or hollow articles to be produced in the molds it is necessary to convert the surface of the cross-section into the circle of the equal surface size in order to calculate the ratio between the diameter and the length of the mold. With the molds in which the size of the cross-section changes over the length of the mold the greater cross-section should lie at the filling opening 5.

The roller extruder 1 is not in the position to push out the plasticized plastic in the precisely dosed equal quantities during seconds or fractions of seconds from the extruder nozzle 2 but the extruder has certain fluctuations. Thus the exchange of molds 3 positioned against the extruder nozzle 2 is not controlled in time but must be controlled with sensors 10. The molds 3 filled with plastic however do not remain in the position against the extruder nozzle 2 when they are filled because an additional residual pressure in addition to the high pressure generated is developed in the roller extruder 1. On the other hand, the roller extruder 1 cannot be held for the exchange of the molds but should continually run further. This is obtained, on the one hand, by the arrangement of the base plate 4 with filling opening 5 pressure-tight sealed against the discharge of the plasticized plastic on the upper surface 8 surrounding the extruder nozzle 2 or by a sealed sliding arrangement, and, on the other hand, by closing and sealing the extruder nozzle 2 for a short time during the exchange of the molds against the discharge of the plasticized plastic. To enable such an arrangement, optical sensors 10 actuate, upon the determination of the filling of the mold, a respective switch means to actuate a pressure cylinder or pneumatic cylinder 11. Pneumatic cylinder 11 is provided before a feeding station 12 of guides 6. Mold 3 with the filling opening 5 is inserted into the feeding station 12. At this time another mold previously inserted into a storage station 13 is positioned therein in a waiting zone and the mold 3 to be filled is located against the extruder nozzle 2. By actuation of the pressure cylinder 11 a stroke will be exerted to the refined inserted mold 3 in the direction of elongation of guides 6. This stroke is executed extremely quickly. Thereby the guide plate 4 of the filled mold 3 slides either against the upper surface 8 surrounding the extruder nozzle 2 or against the frame 7 of guides 6 in such a manner that the filling opening 5 remains closed and the extruder nozzle, at this time, is also tightly closed while the sliding movement is carried out. Under the same conditions, the empty mold is moved from the storage station 13 to the extruder nozzle 2 and the filling process starts.

Figure 2:
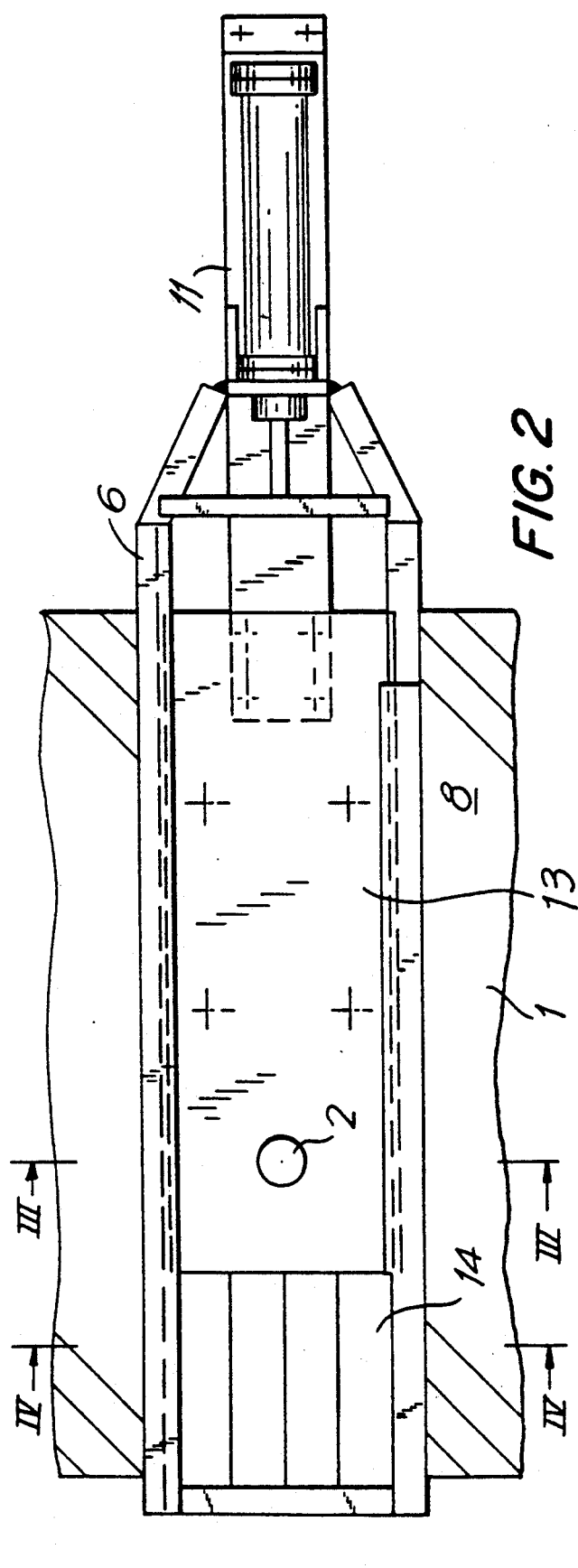
FIG. 2 is a front view of the half-automatically operating device.

The device according to FIG. 2 shows only the filling station or extruder nozzle 2 while FIGS. 3 and 4 show the sections immediately through a discharge station 14. Before each working cycle, a discharge or lifting plate 15 is inserted into the discharge station 14 into the guides 6 or automatically from a magazine behind. Plate 15 is applied to the base plate 4 (FIG. 4) which has the filling opening 5 so as to close the filling opening 5 to prevent flowing the plastic out of the mold. During the working cycle of the pressure cylinder 11 the mold 3 filled with plastic is displaced with its side provided with the filling opening 5 to the discharge or lifting plate 15 while the filling opening 5 becomes closed by plate 15. With the device of FIG. 2, the filled mold can be removed, cooled and opened. After emptying the mold this mold is again fed in guides 6 into the feeding station 12.

Figure 5:
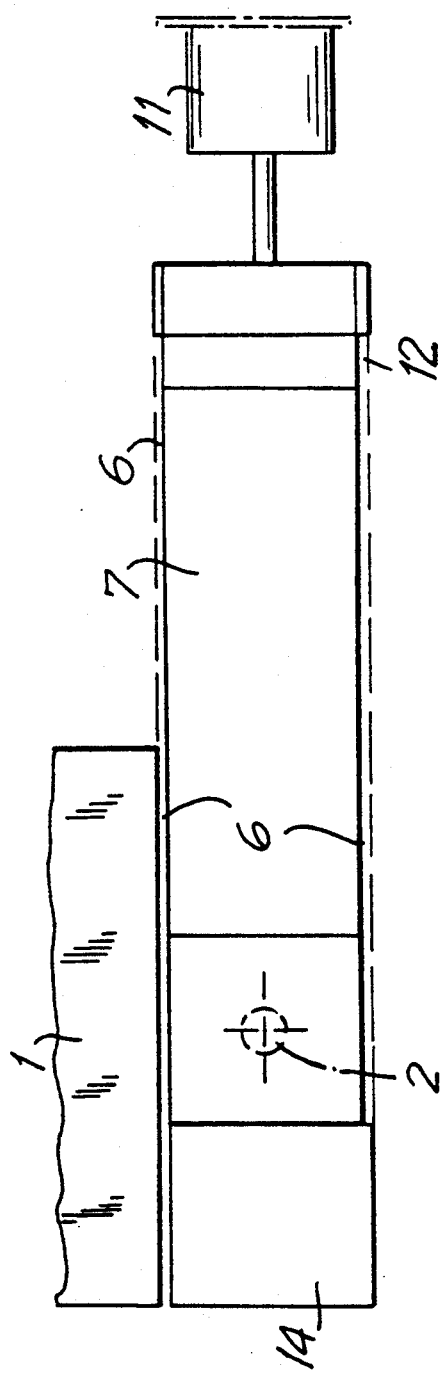
FIG. 5 is a schematic front view of the device of FIG. 2.
Figure 6:
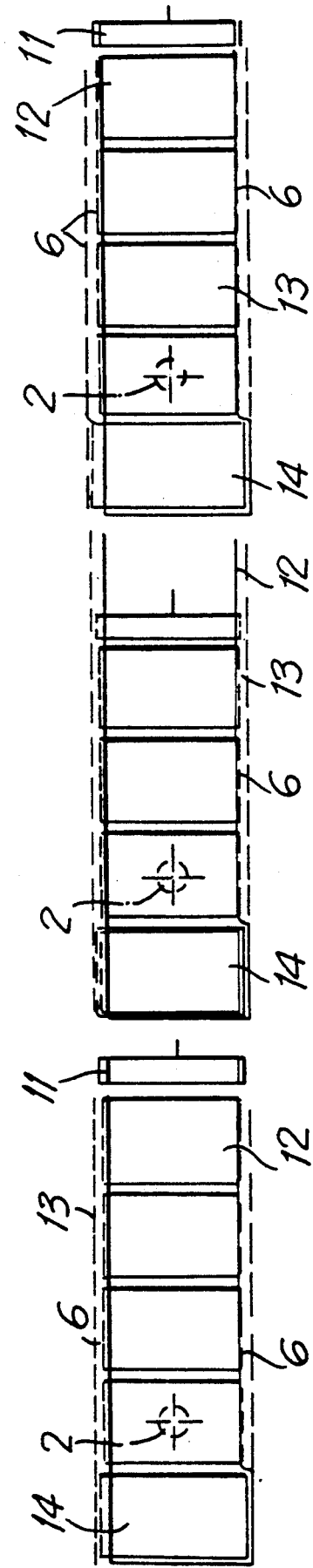
FIG. 6 shows schematically three views of the device of FIG. 5, which views represent a single working cycle.

As shown schematically in FIGS. 5 and 6, guides 6 are provided with the storage station 13 which can receive two molds 3. At each working cycle, the pressure cylinder 11 moves also one empty mold into the feeding station 12, two empty molds 3 into the storage station 13 and one filled mold 3 away from the extruder nozzle 2, whereby the filled mold 3 in the discharge section 14 is moved to the discharge or lifting plate 15. FIGS. 5 and 6 merely show some versions; the amount of molds per station can be varied particularly in the storage station 13.

As mentioned above, with the molds having two base plates 4, additional guides 6 of the structure shown in FIGS. 3 and 4, for a respective base plate should be provided, which would receive the second guide plate, and the feeding station 12 and the discharge station 14 in which C-shaped guides 6 would have respective recesses, and thus the molds 3 with their base plates 4 would be able to move back and forth.

The above described device operates only half-automatically in which a possible quick exchange of the molds before the extruder 1 is effected. The loading of the device with molds 3 to the feeding station 12 and the removal of the filled molds 3 from the discharge station 14, the insertion of the lifting plate 15 are executed manually and must be carried out with the aid of suitable rationalizing devices.

Figure 7:
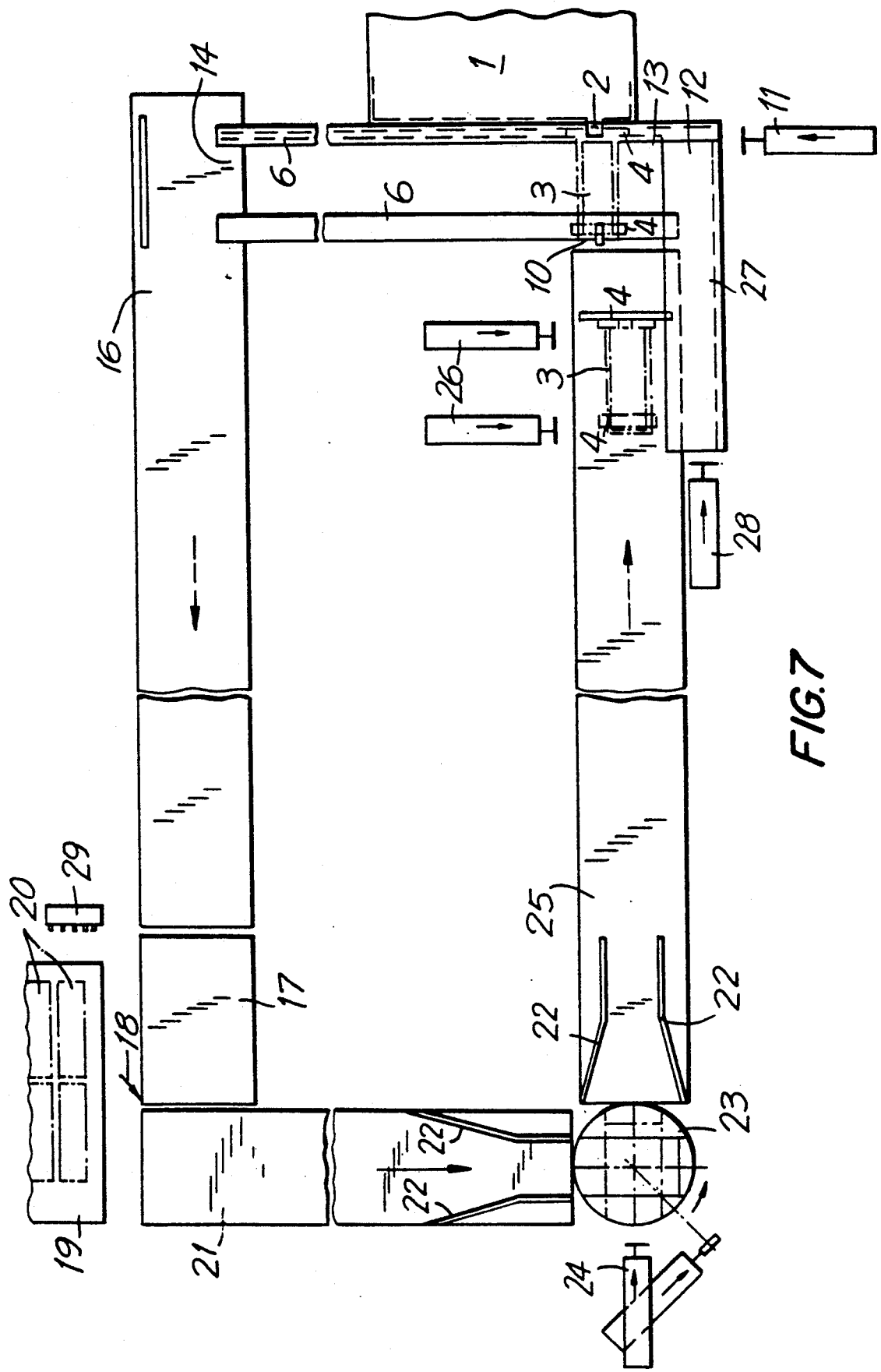
FIG. 7 is a schematic top plan view of the fully-automatically operating device.

FIG. 7 shows a fully automatically operating device. The device is basically similar to that shown in FIGS. 1 to 6. This means that guides 6 for molds 3 with base plates 4 of which one has a filling opening 5, are provided before the extruder 1. The feeding station 12, the storage station 13 and the discharge station 14 are also provided in this device. In order to avoid manual operations connected with the insertion of the discharge plate 15 this plate is omitted in the embodiment of FIG. 7. To provide an effective operation without the discharge plate, either the frame 7 of guides 6 or surface 8 surrounding the extruder nozzle 2 is extended in guides 6 behind the extruder nozzle 2 so far that the base plate 4 with the filling opening 5 remains closed until the plastic in the newly filled mold 3 during the cycle-wise stroke of the pressure cylinder 11 is solidified so far from the edge zones that it would not be able to flow from the filling opening 5. The guides 6 must be also sufficiently long in the region behind the extruder nozzle 2.

With the fully automatic device, the storage station 14 can be shortened to receive only one mold.

It is, of course, understandable that any suitable conventional transporting devices are applicable herein for transporting molds 3 along guides 6 and towards and from guides 6.

The discharge station 14 of the automatic device also has a respective length that is in accordance with a pre-cooling of the plastic in the molds 3 at the end of loading of a conveyor 16 which is so long runs so slowly that the plastic in molds 3 is further hardened The complete solidifying of the plastic would require either a longer line or a longer conveyor 16. Therefore a cooling device 17 is connected with conveyor 16. The cooling device which is not shown in detail has a water bath into which molds 3 filled with plastic are immersed and are cooled there, the molds 3 being guided by a pneumatic grate or screen and at the end being removed from the water bath and fed to the removal station or device. The mold-removal device or station 18 can be an independently operating discharge device In the embodiment shown in FIG. 7, a platform 19 is provided on which molds 3 are released by hand, that is shaped articles 20 are removed and laid onto the platform 19. The conveyor 16 extends normal to the course of guides 6. A further conveyor extends normal to the removal station and is adjacent to the end of the latter. The molds 3 are transferred to further conveyor 21 with their base plates 4 having filling openings 5 facing the front. In order to move molds 3 oriented longitudinally the further or additional conveyor 21 has guide walls 22.

The outlet end of the additional conveyor 22 transmits molds 3 to a carrousel 23. Pressure cylinders 24 correspond to the carrousel 23, which cylinders effect 90° -rotations of the carrousel and thus the molds are positioned thereon with the filling openings 5 at the front side whereas a further pressure cylinder 24 displaces molds 3 after the 90° -turn towards the loading end of an intermediate conveyor 25. These molds with the base plates 4 having filling openings at the front sides are further longitudinally aligned on conveyor 25 by lateral guide walls 22. The intermediate conveyor 25 extends from the carrousel 23 up to the vicinity of the feeding station 12 of guides 6. In the region of the outlet end of the intermediate conveyor, are provided two pressure cylinders 26 which operate in the direction perpendicular to the direction of elongation of the intermediate conveyor 25. A U-rail 27 is provided at the side of conveyor 25, opposite to pressure cylinders 26. The U-shaped rail 27 extends parallel to the intermediate conveyor 25 and opens into the feeding station 12 of guides 6. If a mold 3 appears in the working region of the pressure cylinders 26 this mold will be moved transversely of conveyor 25 into the U-shaped rail 27. The latter has at its end, which faces away from the feeding station 12, a pressure cylinder 28 which further moves the mold in the direction towards the feeding station 12. The pressure cylinder 11 is, at this time, active in the feeding station 12, and this pressure cylinder 11 periodically feeds molds 3, depending on the signals of optical sensors 10, into the guides 6.

Individual work strokes of the pressure cylinders are pressure-contact controlled with the exception of the pressure cylinder 11 so that a stop-free operation is ensured. By storage lengths for molds 3 which are provided in the U-shaped rail 27 non-uniform stroke cycles of the empty molds can be compensated. The individual operation strokes or cycles are controlled by a switch box 29 whereby safety locking and other measures are provided to ensure a friction-free process.

The fully automatic device of FIG. 7 operates in such fashion that the empty mold 3 is fed from the feeding station 12 into the guides 6 whereby it moves the empty molds from the storage station 13 and the mold 3 moves before the extruder nozzle 2. After the refilling of the mold 3 the optical sensors 10 release a new operation stroke of the pressure cylinder 11. The molds 3 filled with plasticized plastic move in the guides 6 until the filling openings 5 are closed by solidified plastic and no plastic would flow from the filling openings 5. Then the molds will arrive at the discharge station 14, move along the conveyor 16 and will be subjected to a further cooling. The mold is cooled off in the cooling device 17 so that it can be easily opened. The shaped objects or articles 20 are laid on the platform 19 from which they are transported further while the empty molds 3 are conveyed to the additional conveyor 21, carrousel 23, intermediate conveyor 25 and again via the U-shaped rail 27 back to the feeding station 12. Thereby a closed circuit of the mold movement is ensured.

A series of rather large heavy shaped objects can be produced from plastic refuse by the device of FIG. 7. These shaped objects can be of the shape and nature required on the market. Therefore not only the problem of plastic refuse is overcome due to the present invention but also in case difficulties arise in the elimination of plastic refuse it can be converted into a crude product which would be later adapted to certain needs.

It will be understood that each of the elements described above, or two or more together, may also find a useful application in other types of devices for producing shaped objects from thermoplastic materials differing from the types described above.

While the invention has been illustrated and described as embodied in a methods and devices for producing shaped objects from thermoplastic plastic, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device for producing shaped objects from thermoplastic plastic material, particularly non-sorted plastic refuse, comprising an extruder for plasticizing said plastic material and pushing out the plasticized plastic material from an extruder nozzle into molds, said molds being guided by a guide means and transported into (i) a filling position in front of said nozzle where said molds are each filled with the pushed-out plasticized plastic material, and (ii) a discharge position where the plasticized plastic material filled into each mold is cooled and unloaded from the respective mold thereby forming said shaped object, the improvement comprising (a) said extruder being an extruder designed to push out continually said plasticized plastic material with a pressure up to 140 Bar without being held for an exchange of said molds;

(b) said molds being each provided with an integral base plate having a filling opening;

(c) means for pressure-tight sealing the filling opening of each base plate against a discharge of the filled-in plasticized plastic material;

(d) means for closing and sealing said extruder nozzle for a short time during the exchange of the molds against a discharge of the pressurized plasticized plastic material from said roller extruder, said means for closing and sealing said extruder nozzle for a short time comprising a sliding contact between the base plates of the filled mold and the mold subsequently to be filled and a surface surrounding said extruder nozzle; a feeding station; a first pressure cylinder provided in said feeding station and aligned in a direction of elongation of said guide means and having a working stroke with a length corresponding to the width of said base plate, said guide means including a storage station positioned next to said feeding station, said storage station having a length corresponding at least to the width of said base plate; a filling station in which said nozzle is positioned and including a waiting zone, said waiting zone having a length corresponding to the width of a number of base plates, at least one mold with the base plate thereof sealingly sliding against a surface surrounding the nozzle; and a discharge station having means to sealingly hold said base plate and to close said filling opening.

2. A device as defined in claim 1, wherein said means for pressure-tight sealing the filling opening of each base plate comprises
   (a) in the filling position of each mold, a sliding contact between the respective base plate and a surface surrounding said extruder nozzle;
   (b) during the transportation from said filling position to said discharge position of each mold, a sliding contact between the respective base plate and a frame of elongated guides extending in parallel to the surface surrounding said extruder nozzle, and
   (c) in the discharge position of each mold, an element selected from the group consisting of a lifting plate inserted into the mold to be applied to the respective base plate, and an extension of said guides with a length so that the respective base plate with said filling opening remains closed until the filled-in pressurized, plasticized plastic material is solidified at such a distance from edge zones of the mold that it would not be able to flow from the filling opening.

3. A device as defined in claim 1, wherein said means to sealingly hold said base plate and to close said filling opening include a lifting plate appliable to said base plate and insertable into and removable from said discharge station.

4. A device as defined in claim 1, wherein each of said molds includes two opposed end faces and is provided with one base plate at each of said end faces.

5. The device as defined in claim 4, wherein said base plates are of the same shape and size.

6. The device as defined in claim 1, wherein said molds have a volume to receive 100 or more kg of the plasticized plastic from said extruder.

7. The device as defined in claim 1, wherein said molds are formed with hollow spaces for shaping nonprismatic objects, said molds having each said base plate with said filling opening provided at an end face of a largest cross-section.

8. The device as defined in claim 5, wherein each mold has in a base plate opposite to said base plate having said filling opening holes (9) for optical observation of a filled condition of the plastic in the mold.

9. The device as defined in claim 1, wherein a ratio between a diameter and a length of each mold is at most 1.15.

10. The device as defined in claim 2, wherein said elongated guides (6) include a C-shaped rail having two opposite portions spaced from each other and connected to each other by said frame (7).

11. The device as defined in claim 5, further including a first conveyor (16) extending perpendicular to said guide means and connected to a discharge station (14); cooling means (17) for cooling said molds and including a water bath receiving said molds and a pneumatic grate and connected to said first conveyor, said cooling means having at an end thereof a mold-opening station (18); a platform positioned at said mold-opening station so that shaped objects are removed from said molds and placed on said platform; a second conveyor (22) extending perpendicular to said first conveyor and receiving and transporting emptied molds, said second conveyor having means for aligning the molds being transported longitudinally of the second conveyor; a carrousel (23) connected to said second conveyor for turning said molds by 90° and provided with another pressure cylinder (24); an intermediate conveyor (25) receiving said molds pushed by said another pressure cylinder (24) from said carrousel, said intermediate conveyor extending at right angles to said second conveyor (21) and transporting said emptied molds to a feeding station; a U-shaped rail extending parallel to said intermediate conveyor and receiving said molds therefrom ; two further pressure cylinders (26) positioned laterally of said intermediate conveyor for pushing said molds into said U-shaped rail in a direction transverse to an elongation of said intermediate conveyor, said U-shaped rail opening into said feeding station (12) and having an additional pressure cylinder (28) displacing said molds along said U-shaped rail towards said feeding station, said another pressure cylinder (24), said further pressure cylinders (26) and said additional pressure cylinder (28) each being contact controlled, said first pressure cylinder (11) aligned in a direction of elongation of said guide means being controlled in said filling station by sensors (10) corresponding to said molds and sensing the filling of said molds so as to control said first pressure cylinder (11) depending upon the filling of said molds for the displacement of said molds.

* * * * *